Aug. 14, 1951   F. I. JADEN   2,564,065
FOLDING FISH POLE HOLDER
Filed May 24, 1949
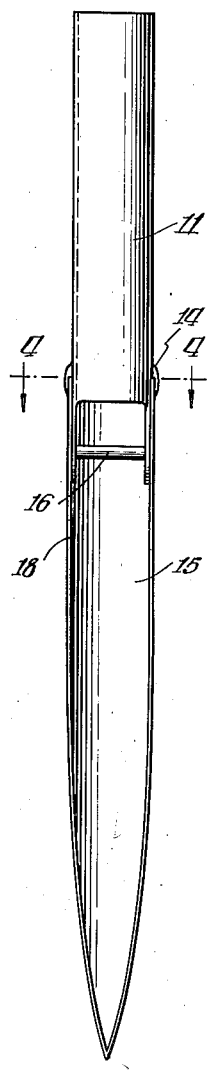
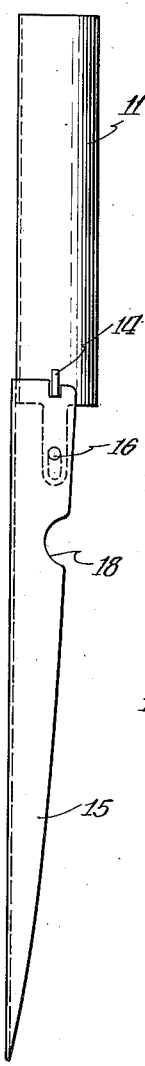
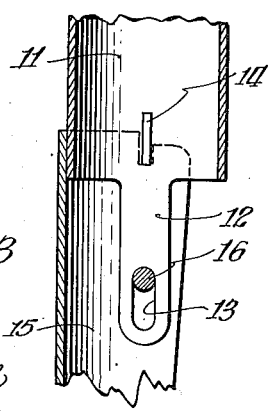
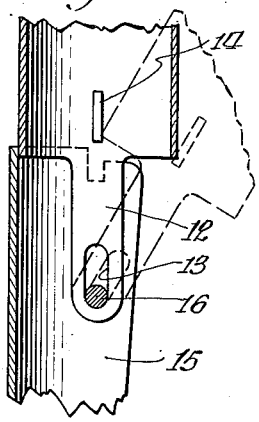
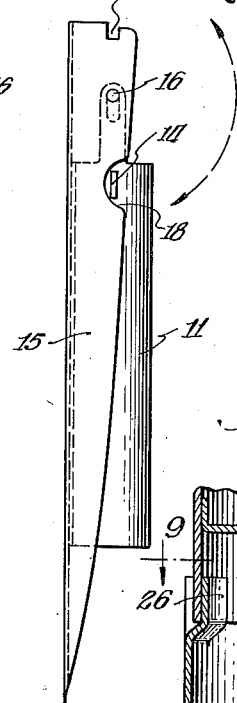
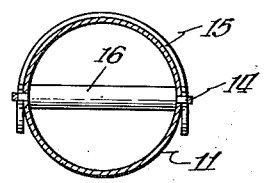
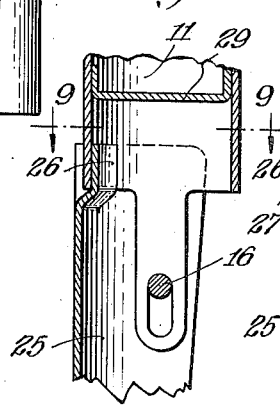
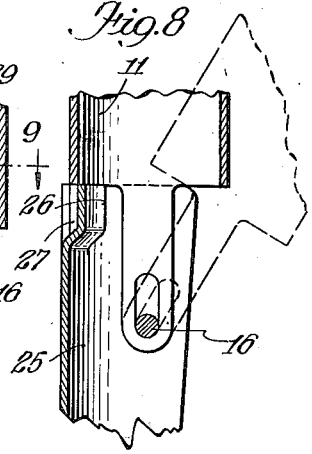
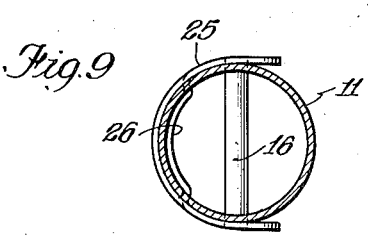
Inventor:
Fred I. Jaden
By: Alois W. Graf
Attorney

UNITED STATES PATENT OFFICE 2,564,065

FOLDING FISH POLE HOLDER

Fred I. Jaden, Chicago, Ill.

Application May 24, 1949, Serial No. 94,990

2 Claims. (Cl. 248—46)

The present invention relates to a fishing pole holder, and more particularly, to a folding fishing pole holder which may be conveniently carried in a fishing tackle box.

For fishing along the shores of lakes or on the banks of the streams, it is frequently desired to fix the position of the fishing pole so that it is not necessary to hold it continuously. It would be desirable to provide an arrangement which would adequately and properly support a fishing pole in all types of soil, but which, nevertheless, would not be so large or cumbersome as to be unwieldy for convenient carrying.

In accordance with the present invention, it is proposed to provide a relatively simple folding fish pole holder which may be opened up for supporting a fishing pole along the lake shore or along the banks of a stream. Such device, however, must be provided with a sharp edged portion which will readily penetrate dense clay and gravel and which also will have adequate length to properly support the pole in loose or soft soil.

It is, therefore, an object of the present invention to provide an improved fishing pole holder which may be folded.

A still further object of the present invention is to provide an economical fishing pole holder of a relatively smooth configuration which is readily and conveniently carried in the usual fishing tackle box.

Other and further objects of the present invention subsequently will become apparent by reference to the following description taken in conjunction with the accompanying drawing, wherein Figure 1 is a front view of a folding fish pole holder constructed in accordance with the present invention;

Figure 2 is a side view of the holder of Figure 1 when extended for use;

Figure 3 is a side view of the holder of Figure 1 when folded for convenient carrying;

Figure 4 is a cross-sectional view as seen in the direction of the arrows along the line 4—4 of Figure 1;

Figure 5 is a vertical cross-sectional view illustrating certain details of the construction;

Figure 6 is a vertical cross-sectional view similar to Figure 5 showing the parts in position for folding the holder;

Figure 7 is a vertical cross-sectional view of a holder having a modified construction;

Figure 8 is a vertical cross section of a holder of Figure 7 with the parts in position for folding;

Figure 9 is a horizontal cross-sectional view as seen in the direction of the arrows along the line 9—9 of Figure 7.

Referring to Figures 1 to 6 of the drawing, it will be seen that a folding fish pole holder constructed in accordance with the present invention has a cylindrical or tubular portion 11 which, adjacent its one end, has a pair of ears 12 each provided with an elongated aperture 13. The tubular member 11 is provided with a plurality of formed or punched out protuberances 14 which are arranged to engage notches 17 in a cooperating member 15.

The cooperating member 15 consists of an oblique section of a cylindrical member or tubular body which is adapted to be forced into the earth for supporting the tubular member 11. The oblique section 15 of the tubular or cylindrical member is pivotally connected to the upper cylindrical member 11 by means of a pivot rod 16 which passes through the aperture 13 in the ears 12 of the member 11. The pivot rod 16 as is apparent from Figure 5 engages the upper end of the elongated slot 13 in the ears 12 when the fishing rod holder is in extended position. If it is desired to fold the fishing pole holder for storage, the member 11 is moved upwardly relative to the supporting member 15 as illustrated in Figure 6, whereby the projection 14 is disengaged from the notch 17. As indicated by the dotted lines in Figure 6, the member 11 may then be rotated relative to the lower member 15.

Figure 3 illustrates the folded position of the fishing pole holder wherefrom it becomes apparent that the cylindrical portion 11 is of slightly lesser diameter than the oblique section 15 so that these two members nest together. The spade or supporting body 15 is provided with recesses 18 so as to accommodate the outwardly extending projection 14, adjacent the lower end of the supporting cylinder 11.

While in the arrangement illustrated in Figures 1 to 6, the projections 14, are extending outwardly, it, of course, will be apparent to those skilled in the art, that inwardly extending projections could be provided on the member 15, whereupon the upper member 11, would be provided with notches corresponding to the notch 17. Since this is a mere reversal of parts, it is deemed unnecessary to illustrate such construction in the drawings.

In the foregoing description it will be noted that one portion of one of the two members has a portion which engages a notch in the other of the two members. A somewhat different arrangement is illustrated in Figures 7, 8, and 9. Here it will be noted that the upper cylindrical member 11 is similar to that illustrated in the preceding figures. The lower spade-like element 25, however, has a plurality of notches 27 formed by the inwardly punched portion 26. A portion of the outer wall 26 is moved inwardly in the formation of this portion of the spade 25 so that the lower edge of the upper cylindrical member 11, fits between it and the inner surface of the spade 25. These figures also illustrate another feature which may be added to the fishing pole holder which comprises a strap or support 29 extending across the lower portion of the cylindrical member 11. When this is engaged by the lower extremity of the fishing pole or rod, a force is exerted upon the ears 12, so that there is no possibility of dislocating the upper member 11, relative to either of the lower members 15 or 25.

While for the purpose of illustrating and describing the present invention, certain preferred embodiments have been illustrated in the drawing, it is to be understood that the invention is not to be limited thereby, since such variations in the components and in their arrangement are contemplated as may be commensurate with the spirit and scope of the invention set forth in the accompanying claims.

What I desire to protect by United States Letters Patent is claimed as follows:

1. A fishing pole holder comprising a fish pole receiving tubular member having opposed ears, each provided with a longitudinal slot, a supporting member for such tubular member, adapted to be pushed into the earth and comprising a generally oblique section of a second tubular member of slightly larger diameter, a pivot pin extending through said latter member adjacent one end thereof, and passing through said slotted ears, said pivot pin also serving as a stop for the end of the fish pole, latching means formed in adjacent end portions of both said members for retaining said members in extended position and comprising a plurality of notches in one member for engaging cooperating portions of the other member.

2. A fishing pole holder comprising a fish pole receiving tubular member having opposed ears, each provided with a longitudinal slot, a spade-like supporting member for said tubular member adapted to be pushed into the earth and comprising a generally oblique section of a second tubular member of slightly larger diameter, said supporting member being of greater length than said first tubular member, a pivot pin extending through said latter member adjacent one end thereof and passing through said slotted ears, latching means formed in adjacent end portions of both said members for retaining said members in extended position and comprising a plurality of notches in one member for engaging cooperating portions formed in the other member adjacent said pivot.

FRED I. JADEN.

REFERENCES CITED

The following references are of record in the file of this patent:

UNITED STATES PATENTS

| Number | Name | Date |
|---|---|---|
| 1,952,789 | Butts | Mar. 27, 1934 |
| 2,311,823 | Gaskill | Feb. 23, 1943 |
| 2,451,363 | Sonner | Oct. 12, 1948 |